United States Patent
List et al.

(10) Patent No.: US 6,317,666 B1
(45) Date of Patent: Nov. 13, 2001

(54) METHOD FOR ANALYZING THE DRIVEABILITY OF MOTOR VEHICLES

(75) Inventors: Helmut List, Graz; Peter Schöggl, Seiersberg, both of (AT)

(73) Assignee: AVL List GmbH, Graz (AT)

( * ) Notice: Subject to any disclaimer, the term of this patent is extended or adjusted under 35 U.S.C. 154(b) by 0 days.

(21) Appl. No.: 09/387,706

(22) Filed: Aug. 31, 1999

(30) Foreign Application Priority Data

Sep. 1, 1998 (AT) .................................................. 574/98 U

(51) Int. Cl.$^7$ ............................. G01M 7/00; G01M 1/00; G01M 17/00; G06F 3/00; G06F 7/00; G06F 9/00; G06F 12/00; G06F 15/00

(52) U.S. Cl. ......................... 701/29; 701/30-35; 701/91; 701/110; 701/111; 701/101; 701/102; 180/65.1; 180/65.3; 180/76; 180/79.1; 180/197; 180/272; 123/205; 123/297; 123/325; 123/333; 123/336; 123/357; 123/416; 123/417; 123/406; 123/411; 123/501; 123/502; 303/93; 303/97; 303/100; 303/109; 340/576; 340/439; 340/425.5

(58) Field of Search ................................ 701/29–35, 91, 701/110, 111, 101, 102; 180/65.1, 65.3, 65.4, 65.8, 76, 79.1, 197, 965, 272; 123/205, 297, 325, 333, 336, 357, 416, 417, 406, 407, 411, 501, 502, 479; 73/116, 117.3, 117.2, 117.1; 74/866, 857, 865, 860; 303/93, 97, 100, 109; 340/576, 439, 425.5

(56) References Cited

U.S. PATENT DOCUMENTS

| | | | |
|---|---|---|---|
| 4,515,041 | * 5/1985 | Frank et al. | 74/866 |
| 4,763,630 | * 8/1988 | Nagase et al. | 123/501 |
| 5,101,786 | * 4/1992 | Kamio et al. | 123/399 |
| 5,172,784 | * 12/1992 | Varela, Jr. | 180/65.4 |
| 5,313,388 | * 5/1994 | Cortis | 364/424.04 |
| 5,313,922 | * 5/1994 | Demel | 123/333 |
| 5,351,776 | * 10/1994 | Keller et al. | 180/79.1 |
| 5,463,551 | * 10/1995 | Milunas | 305/426.02 |
| 5,465,079 | * 11/1995 | Bouchard et al. | 340/576 |
| 6,038,554 | * 3/2000 | Vig | 705/400 |
| 6,079,258 | * 6/2000 | List et al. | 73/117.3 |

* cited by examiner

Primary Examiner—William A. Cuchlinski, Jr.
Assistant Examiner—Ronnie Mancho
(74) Attorney, Agent, or Firm—Dykema Gossett PLLC

(57) ABSTRACT

This invention relates to a procedure for analyzing and influencing the driveability of motor vehicles, including the following steps:

Conducting tests on a real vehicle to obtain measurement variables describing its driveability;

Continuous monitoring to check whether at least one of a number of predefined trigger conditions is fulfilled, i.e., whether a certain set of variables takes on certain values;

If the trigger condition is fulfilled, computation of a profile of several ratings representing vehicle driveability from one or more measured values, using predefined functional relationships.

An improvement of analysis and control is achieved by deriving from the measurements at least one variable representing the type of driver of the vehicle concerned, and by determining the value of at least one control variable influencing vehicle driveability as a function of the value of the driver-related variable, such that the profile of the several ratings closely approaches a predetermined profile depending on the variable representing the type of driver.

15 Claims, 4 Drawing Sheets

METHOD FOR ANALYZING THE DRIVEABILITY OF MOTOR VEHICLES

BACKGROUND OF THE INVENTION

This invention relates to a procedure for analyzing and influencing the driveability of motor vehicles.

A major criterion in the subjective assessment of a motor vehicle by the driver or passengers is vehicle driveability. This term refers in general to a driver's personal impression of the vehicle's general operation, particularly in transient operational states.

DESCRIPTION OF THE PRIOR ART

In EP 0 846 945 A of the applicant a method for analyzing the driveability of motor vehicles is described, which includes the following steps:

Running tests with the use of a real vehicle to obtain measurement variables on its driveability;

Continuous monitoring to check whether one of a number of predefined trigger conditions is fulfilled, i.e., whether a certain set of variables takes on certain values;

If trigger conditions are fulfilled, computation of at least one rating representing vehicle driveability from one or more measured values, using a predefined functional relationship.

Output of the rating.

The rating concerned is a variable which represents the quality of the vehicle with regard to driveability. By means of a complex computing procedure and calibration conducted with the assistance of test drivers a close correlation is established between the rating computed from the measured values and the subjective judgment passed by the drivers.

It is natural that assessments on the driveability of one and the same vehicle made by different test drivers will differ within a certain range. It has been found, however, that such differences have a certain systematic component in addition to a stochastic component.

Similarly, the expectations and demands of different drivers with regard to a vehicle's driveability will always differ to some extent. This implies that it will not be possible generally to optimize driveability in such way that it is actually experienced as the optimum by all drivers. A comfort-oriented driver, for example, may find a jolting car motion most irritating, whilst a sporty driver may even enjoy jolting in certain manoeuvers.

In EP 0 304 089 A and DE 37 15 423 A methods and devices are described where different sensor signals provide information on the particular type of driver involved, and the engine or vehicle in general is adjusted accordingly. From the point of view of control theory this corresponds to open-loop control where a certain measured value will initiate an adjusting process, which will have no feedback on the measured value, however. Naturally, such a procedure is only moderately effective.

SUMMARY OF THE INVENTION

It is an object of this invention to refine the procedure for analyzing the driveability of a motor vehicle such that a closer correspondence will be obtained between computed results and subjective assessments. Furthermore, a procedure for influencing driveability is proposed which will be less dependent on the driver involved.

It has been found that the systematic component in the differences between driveability assessments of different drivers may be characterized by at least one variable. This variable is principally derived from the same data base as vehicle driveability; if required, additional variables are measured. The variable can be correlated with verbally defined types of drivers. Basically, there are several different ways of deriving one or more variables from the measured values. It is possible, for instance, to define a variable which represents a comfort-sportiness index. The driver would receive ratings on a continuous scale ranging from very comfort-oriented to very sporty. As an alternative it would be possible to define an independent variable each for comfort and sportiness. Another possibility would be to permit only certain discrete values for the variable, each of these values corresponding to a certain predefined type of driver. In words, such types could be referred to as cautious, comfort-oriented, unpracticed, sporty, hectic, etc. It would further be possible to define a number of behavioral variables and, in a second step, to build a classification into different types. Such behavioral variables could be comfort/sportiness, economy-mindedness, driving skill, etc. In such instance a multidimensional rating is produced, i.e., a specific driver'profile is prepared from the different variables assessing different characteristics.

The above described verbal interpretation of the meaning of the variables will only serve to promote comprehension and improve the presentation of the procedure according to the invention. In the actual implementation of the procedure mathematical and statistical methods are used in order to ensure the required accuracy and reproducibility.

The main difference between the present invention and known procedures using driver classifications is that the type of driver determined will enter the driveability computation, such that a multi-loop control system is obtained which will result in a more or less adaptive-self-learning optimization of vehicle driveability.

It is an essential feature of the invention that vehicle driveability is perceived as a quality which is not independent of the specific driver of the vehicle. The driver enters the computation in such way that the measured values will supply information on his behaviour. The frequency with which the throttle valve opens or closes, for example, will indicate whether a driver is relaxed and comfort-oriented, or sporty and aggressive. For proper assessment of the type of driver involved, measured values may be employed which do not directly enter the determination of driveability, such as the steering angle or rate of change of the steering angle.

When the system is calibrated with the assistance of test drivers, the drivers are classified and assigned to a corresponding type, and the variable classifying the driver type is given a certain value. For this purpose one and the same vehicle in one and the same parameter setting should be given more or less the same ratings by drivers of the same type, whilst it may be assessed differently by drivers of other types.

There are several different possibilities of influencing the driveability of a vehicle in dependence of the type of driver using it. First of all, the type of driver is found by means of the actions performed by the driver. Depending on the type of driver determined in this way a change in parameter settings may be effected in a first variant of the invention. This implies that engine characteristics are selected from a set of several possibilities such that the expected driveability will be optimally matched with the specific type of driver involved. To this open-loop control a closed loop system is added, which will be further discussed below.

In a preferred variant of the invention a deviation of the momentary rating or ratings from one or several target values is continuously monitored, the target values being derived according to predefined functional relationships from the simultaneously obtained variables representing the driver type. By means of known multi-dimensional control methods, for example systems based on neural networks, it is attempted to minimize the deviation error. Neural networks are simplified, computer-adapted simulations of human brain cells and comprise an optional number of inputs, outputs, nodes and node links on different levels. By training a neural network node weights can be determined, which will permit the effects of any changes in input quantities on the output quantities, i.e., the measured values, to be predicted. In the instance of a deviation error an estimate is provided in which way the input quantities, i.e., choice of engine characteristics, etc., are to be modified in order to reduce the error. Since the internal working of the system is not fully known, such a procedure will be an iterative process which may require a large number of steps to find an optimum.

In an especially preferred variant, the above control scheme is characterized by different time-scales. Some control activities will take place instantaneously, for instance when an abrupt depression of the accelerator pedal indicates that the driver desires immediate maximum acceleration for a quick pass, for example. In this instance the adequate measures are taken immediately in order to provide maximum power regardless of jolting or the like. At the beginning of a new ride, on the other hand, when a change of driver may have taken place, the basic setting of the vehicle parameters is adapted to the driver type determined. To be able to respond to changes in a driver's needs in the course of a ride, significant changes in his behaviour are registered at short intervals, for instance once per minute, and fine tuning of performance takes place accordingly.

In addition to the above measures of adjusting vehicle operation to a specific driver, it will be possible to detect and compensate long-term changes in the vehicle itself due to wear, ageing, faults, etc. Among long-term effects due to ageing the type of idle speed control could be altered for example, if this should prove desirable.

In a variant of the procedure described by the invention one of the findings obtained could be the degree of vehicle control on part of the driver, i.e., his driving skill. Various measured values, such as individual wheel speeds, transverse acceleration, and the rotational angle above the vertical axis, will indicate to which extent the vehicle is within the limits of control. In addition, the degree of a driver's skill may be derived from these values as stated above. Correlation of these two findings will yield the index indicating to which extent the driver has reached his personal limits. For example, this index may be designed such that a value of 100% indicates that the driver is at this moment at the limit of his ability to securely handle the vehicle. In the instance of values greater than 100% it is to be expected that the driver will lose control shortly. On the other hand a certain maximum value of, say, 90% could be defined which would imply the presence of a sufficiently large safety margin to prevent critical situations. Above all, the value can be displayed to warn the driver of critical situations. It is a major advantage of this variant that the experienced and skilful driver will be alerted at a time significantly later than the inexperienced driver, given the same critical situation. In this manner the alert may be tailored to the driver's skill in vehicle handling.

The system would also be of great use with racing cars, where an objective rating supplying information on a car's limits would be commendable. In addition to providing valuable information for the driver and his team, the display of such value may also be of interest for the spectators in a race. For this purpose the relevant data are transmitted to a central monitoring unit.

The invention further relates to a device for analyzing the driveability of motor vehicles, and a device for influencing the driveability of motor vehicles. The procedures described above are implemented with the use of these devices.

DESCRIPTION OF THE DRAWINGS

Following is a more detailed description of the invention as illustrated by the accompanying drawings, in which.

DETAILED DESCRIPTION OF THE PREFERRED EMBODIMENTS

Figure 1:
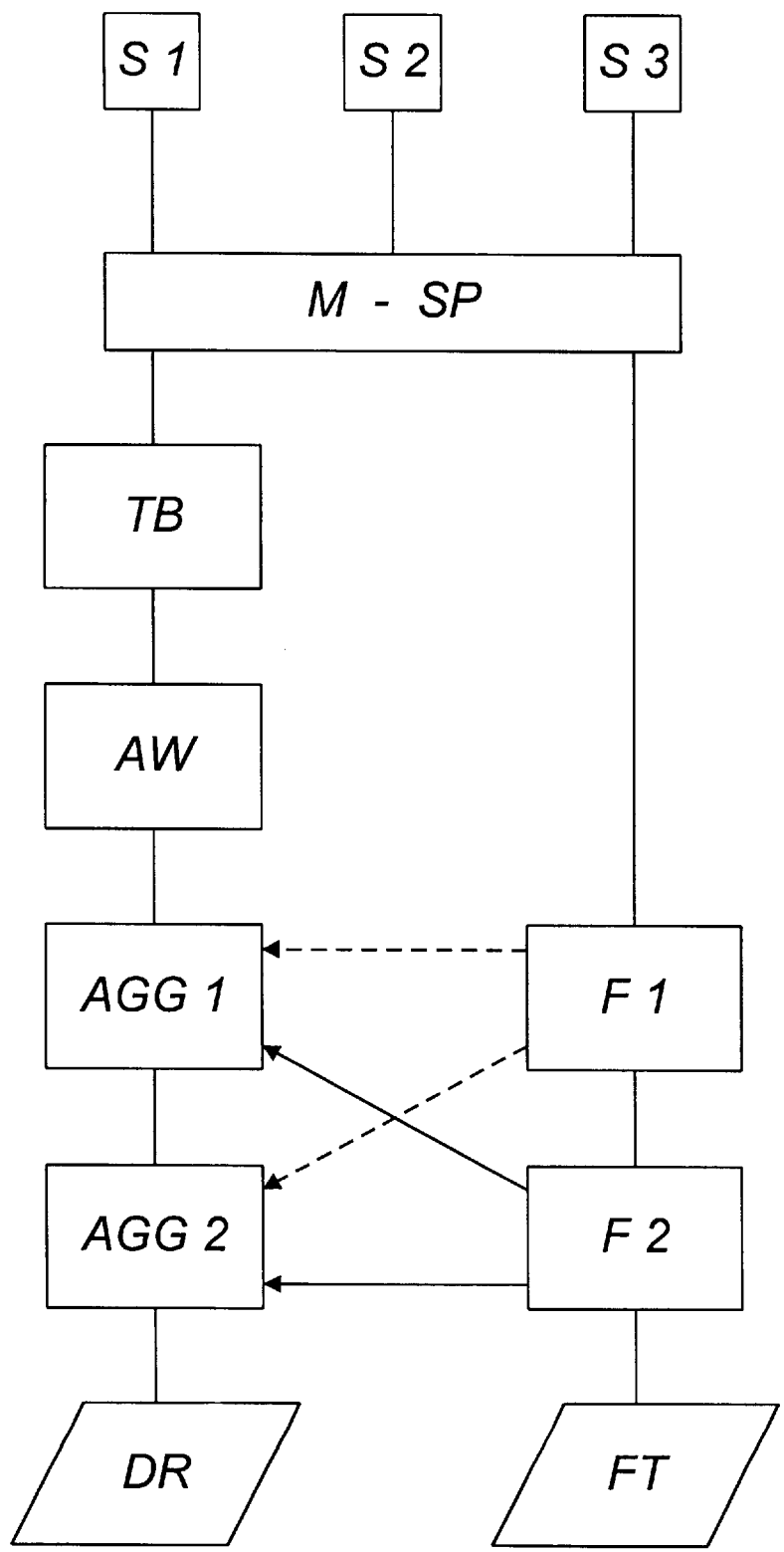
FIG. 1 shows a block diagram of a system for analyzing driveability according to the invention, FIG. 2 a flow chart of the control process in the system of FIG. 1, FIG. 3 a block diagram of a system for influencing driveability, and FIG. 4 a flow chart describing the operation of the system shown in FIG. 3.

A number of sensors S1, S2, S3 pick up measurement values representing the momentary state of the vehicle. Some of these values refer to operating conditions, such as longitudinal acceleration, transverse acceleration, engine temperature, etc., whilst other measured values refer to variables that are directly influenced by the driver, such as position of the accelerator pedal (position of throttle valve), steering angle, rate of change of the steering angle, or seat position. The periodically obtained measurement values are stored in a memory M-SP. In a recognition unit TB the measured values obtained at any time will give rise to the decision whether a so-called trigger condition is encountered. Trigger conditions are predefined operating states which are defined in that the measured values fulfill certain conditions. One of these trigger conditions could be termed "idle", conditions for the idle state arising if a certain engine speed is not reached, or the throttle valve is closed completely or almost completely, or if no gear has been selected or the clutch is disengaged. If such a trigger condition is encountered, a number of predetermined functions are computed from the measured values in an evaluation unit. These functions, which are referred to as criteria, are computed by using not only the values measured at the time when the trigger condition is fulfilled, but also the measured values obtained within a given time period before and after the trigger condition is fulfilled. For example, if the trigger condition "idle" is detected, one or more criteria can be computed which are concerned with the type and extent of jolting vibrations occurring during this period. An even more accurate evaluation is achieved if the operational states defined by means of the trigger conditions are further distinguished. The idle state could be subdivided into detailed operating states, such as idle after starting, idle after load alteration, idle after activation or deactivation of the air conditioning system, idle during steering, idle during braking, etc.

In the course of a 15-minutes driving cycle, for example, trigger conditions may be detected about 1,000 times and the values for the respective criteria may be computed on the basis of the given functions. Criteria of the same kind are averaged in order to arrive at a statistically significant statement. In a first aggregation unit AGG1 a limited number of, say, 15 individual ratings are determined from the multitude of functional values. These ratings may refer to such characteristics as comfort, response, jolting, cold-start, or the like. In a second aggregation unit AGG2 an overall rating is computed from the individual ratings using a given algorithm.

As has been described so far, the system corresponds to a solution as described in publication EP 0 846 945 A, which should be referred to for further details. In the solution proposed by the present invention, however, a set of variables are additionally computed from the measured values in a first driver-related analyzing unit F1, which will represent certain characteristics of the driver concerned, such as sportiness, driving competence, etc. By means of this profile of driver-related characteristics the driver is assigned to one of a number of predetermined types in a second driver-related analyzing unit F2. It is an essential feature of this invention that the type of driver determined in F2 will enter the computation carried out in aggregation units AGG1 and AGG2. The first driver-related analyzing unit F1 may be additionally employed to influence the computation implemented in aggregation units AGG1 and AGG2. This is achieved in the invention by modifying the weighting of the individual ratings according to driver type when an overall rating is prepared. It would also be possible, however, to omit individual criteria from the computation altogether, depending on the type of driver involved. If a driver is found to be particularly sporty, for example, a jolting motion below a certain level could be regarded as irrelevant in the assessment of driveability.

Figure 2:
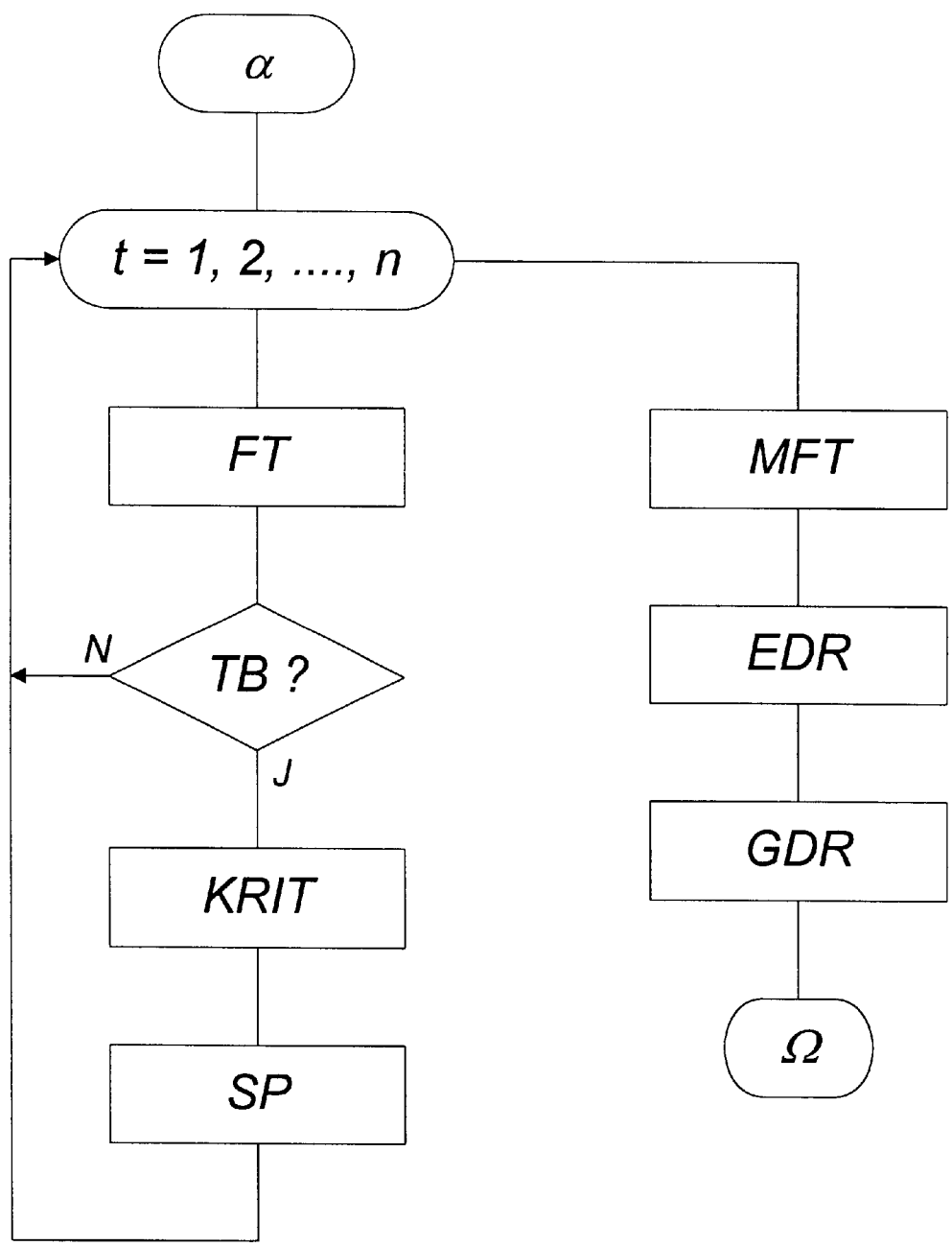

FIG. 2 shows a flow chart representing the sequence of activities in the analyzing system.

In the analysis the same computation cycle is implemented periodically at intervals of a few milliseconds. The values obtained at a time t are inserted in a predetermined function to determine the driver type. This function is derived by statistical methods from tests conducted on a large number of test drivers to analyze their driving behaviour. Furthermore, the data in unit TB are analyzed for the presence of a trigger condition. If no trigger condition is found the program will cycle back to the beginning. Otherwise, i.e., in the presence of a trigger condition, the computing unit KRIT will compute a vector based on predetermined functions, which vector is composed of the individual criteria representing the values of individual ratings at a given moment. This vector is stored in a memory SP and the program will loop back to the beginning once again.

At the end of a predetermined time period or at the end of a ride the stored values are processed by statistical methods. For example, values referring to the same type of states are averaged to compensate errors. In unit MFT an averaged driver type is computed and in unit EDR the criteria are averaged and processed in order to obtain the individual ratings. The individual ratings are also defined verbally, i.e., quality of starting, idle quality, etc., to permit comparison with the subjective judgments passed by the drivers. In computation unit GDR the individual ratings are combined to yield an overall rating, i.e., a single variable representing an overall driveability rating. For this computation predetermined functions are used which depend on the type of driver involved. As a consequence, the fact that a sporty driver will have a different impression of a certain vehicle than a cautious or comfort-oriented driver, will be taken into account.

Figure 3:
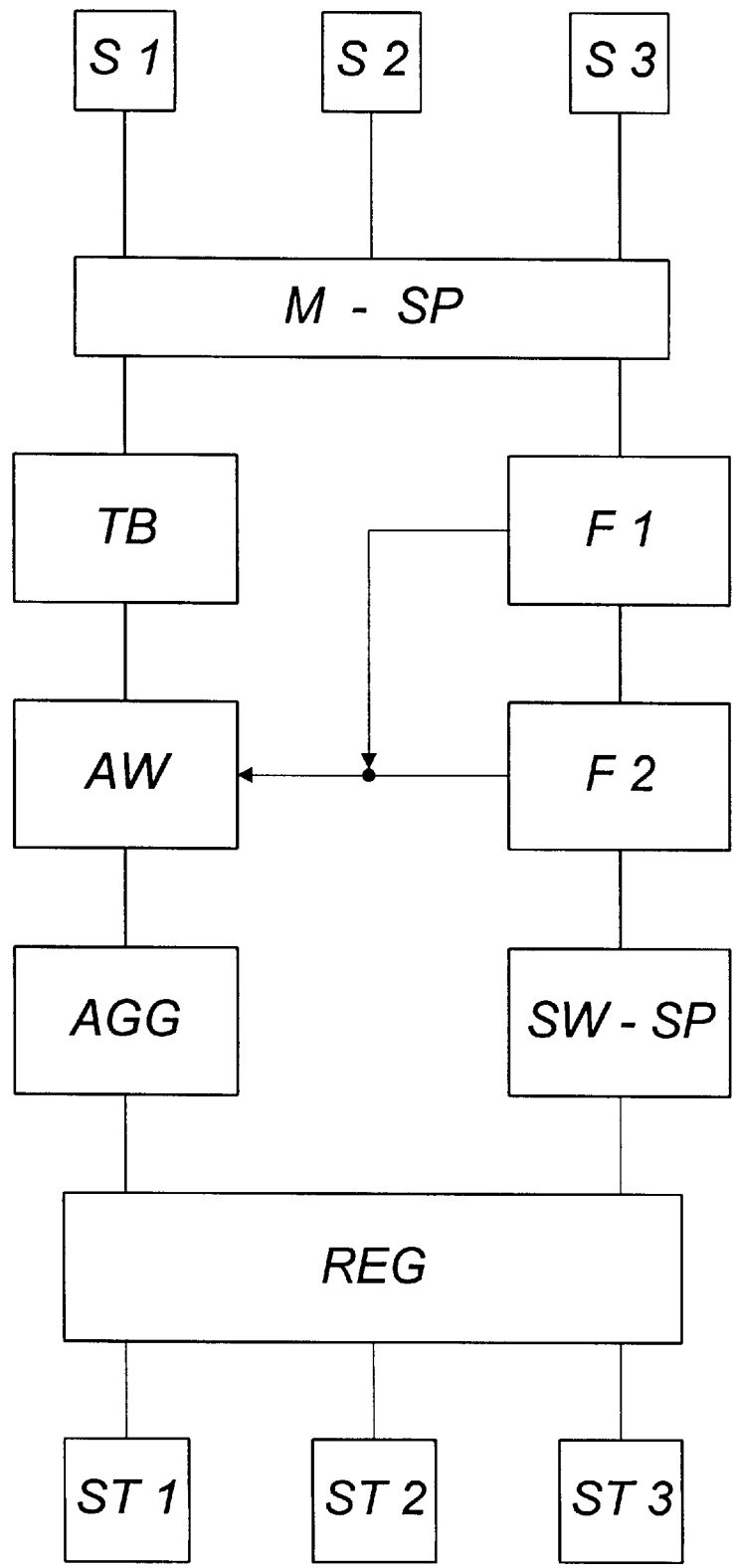

The variant of FIG. 3 corresponds in certain aspects to that of FIG. 1. The following discussion is mainly concerned with the differences. In dependence of the driver type determined a target profile is called up from a corresponding memory SW-SP, which comprises the individual ratings required by a desired driver type. This target profile is obtained by means of a statistical evaluation of the opinions received from a large number of test drivers concerning a number of test rides completed. This need not necessarily mean that for a given individual rating only one specific value may be regarded as the optimum. A range of values or a maximization criterion such as "as large as possible" would also be acceptable. The actual profile supplied by the aggregation unit AGG is compared to the target profile in a control unit REG, and a predetermined control algorithm is employed to send control signals to suitable actuators ST1, ST2, ST3 influencing engine characteristics, for example. This will permit approximation of the driveability profile consisting of the individual ratings to a target profile adapted to the respective driver type.

Figure 4:
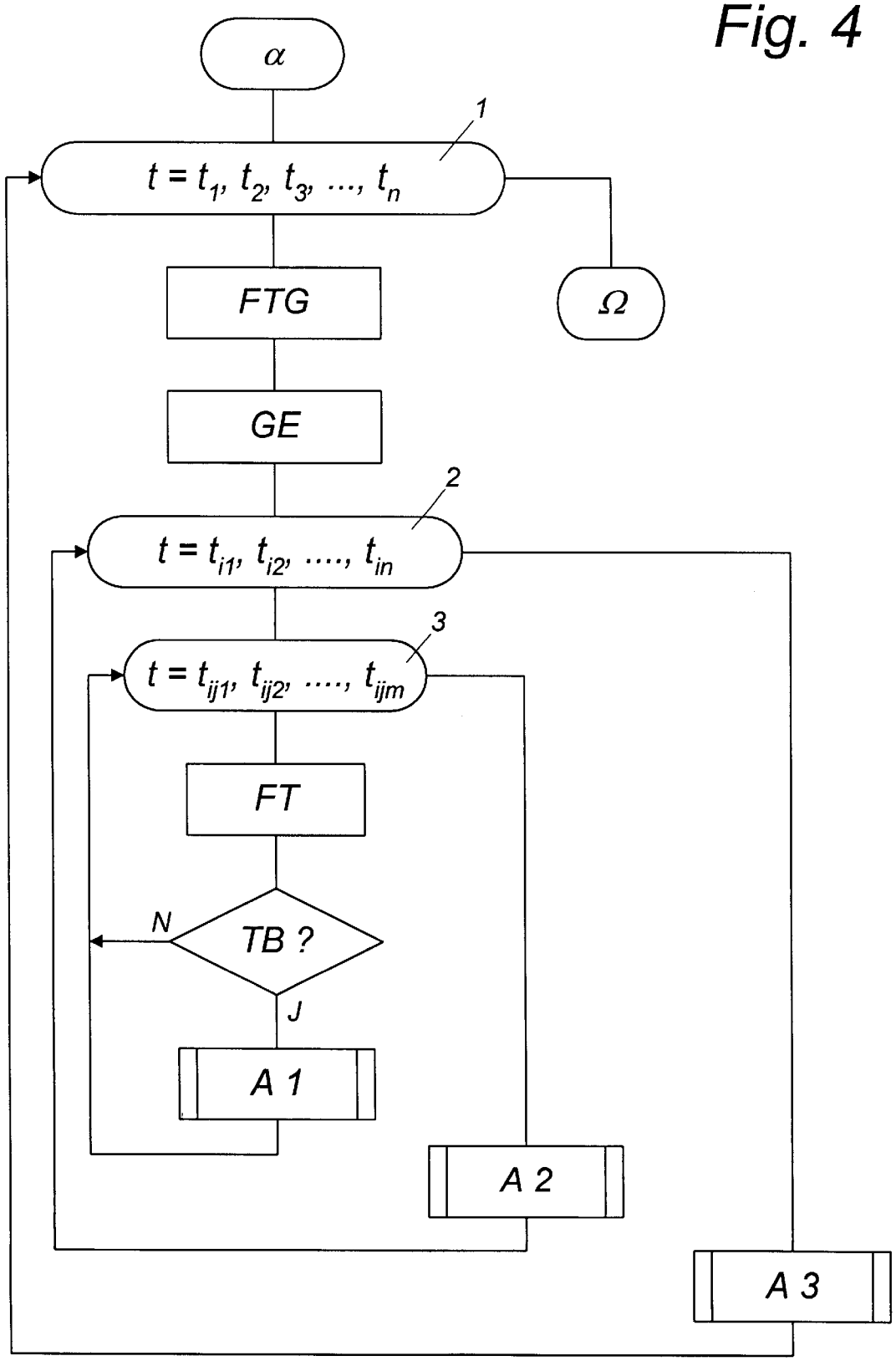

In FIG. 4 the flow of the control algorithm is outlined. A first loop 1 is entered at times $t_1$, $t_2$, $t_3$, which are separated by comparatively large intervals and is newly initiated each time a new ride takes place. First of all, the basic driver type is determined in a unit FTG. It is not necessary in this context that all of the processed data be directly related to driveability. For instance, the position of the driver's seat may be used to generate the refutable hypothesis that a certain driver whose characteristics are already stored in a memory is beginning a new ride. In unit GE a basic parameter setting is implemented in dependence of this driver type. This is followed by a further time loop 2, which is entered at times $t_{i1}$, $t_{i2}$ at intervals of a few minutes. Within this loop yet another loop is provided, which is entered at times $t_{ij1}$, $t_{ij2}$, etc., intervals being in the millisecond region. As described above, the driver type is determined in unit FT, whilst the measured values are examined for the presence of a trigger condition. If no trigger condition is found control will return to the beginning of the innermost loop 3. If a trigger condition is detected, however, a control program A1 is initiated. The target values and actual values for driveability, which are provided in a memory not shown in this flow chart, are compared in this program and, based on the deviation error, signals are transmitted to corresponding actuators in order to reduce this error. In the control program A1 only those actuators are addressed which require immediate adjustment due to the momentary operating state and intention of the driver. If the accelerator pedal is depressed resolutely and completely, for instance, the corresponding engine characteristics are adjusted such that maximum engine power is obtained.

When the innermost loop 3 has been performed a predetermined number of times and the moment $t_{ijm}$ has been reached, the control program A2 is executed. Any changes in vehicle response which are desired by one and the same driver in the course of a ride, are taken into account. Such changes may be desirable in case of a changeover from highway driving to urban driving, for example, or if a basically comfort-oriented driver is in a hurry, or a basically sporty driver is in a relaxed frame of mind. In control program A2 this fine tuning is performed at intervals of a few minutes.

If at a time $t_{in}$ the second loop 2 has been performed a predetermined number of times, the basic setting is checked in a control program A3.

In addition to the above described closed-loop control strategy, which depends on the driver type determined, further optimization of vehicle driveability may be achieved in essentially the same manner. The measured values may be employed to yield information on changes over time in the vehicle itself. This may involve symptoms of wear affecting vehicle driveability or failure leading to a deterioration of driveability. If the most suitable optimization measures are taken such changes in a vehicle due to ageing and wear are compensated automatically. According to the invention it would also be possible, however, to use a separate computing unit in order to allow for such changes and compensate them.

The present invention will not only permit improved assessment of vehicle driveability in dependence of a corresponding driver type, but will also permit a vehicle's driveability to be optimally adjusted to a certain type of driver.

What is claimed is:

1. A procedure for analyzing the driveability of motor vehicles, including the following steps:

Conducting tests on a real vehicle to obtain measurement variables describing its driveability;

Continuous monitoring to check whether one of a number of predefined trigger conditions is fulfilled, i.e., whether a certain set of variables takes on certain values;

If the trigger condition is fulfilled, computation of at least one rating representing vehicle driveability from one or more measured values, using a predefined functional relationship;

Output of the rating;

wherein at least one variable representing the type of driver of the vehicle concerned is derived from the measurement values, and wherein weighting factors are used in computing the rating, which depend on the variable representing the type of driver.

2. A procedure as claimed in claim 1, wherein several variables representing the type of driver of the vehicle concerned are derived from the measurement values, and wherein the driver is assigned to one of a group of predetermined types, in dependence of the values of these variables.

3. A procedure for influencing the driveability of motor vehicles, including the following steps:

Conducting tests on a real vehicle to obtain measurement variables describing its driveability;

Continuous monitoring to check whether one of a number of predefined trigger conditions is fulfilled, i.e., whether a certain set of variables takes on certain values;

If the trigger condition is fulfilled, computation of a profile of several ratings representing vehicle driveability from one or more measured values, using predefined functional relationships;

wherein at least one variable representing the type of driver of the vehicle concerned is derived from the measurement values, and wherein the value of at least one control variable influencing vehicle driveability is determined in dependence of the value of the driver-related variable, such that the profile of the several ratings closely approaches a predetermined profile depending on the variable representing the type of driver.

4. A procedure as claimed in claim 3, wherein an overall rating is computed from the several ratings, the variable representing the type of driver entering the computation, and wherein a maximization of the overall rating is effected by a change in the at least one control variable.

5. A procedure as claimed in claim 3, wherein changes in several control variables are effected at different intervals of time.

6. A procedure as claimed in claim 1, wherein a variable representing the degree of a driver's driving skill is derived from the measured values.

7. A procedure as claimed in claim 1, wherein the at least one rating and, if required, measured values are transmitted to a monitoring unit independent of the vehicle.

8. A device for analyzing the driveability of motor vehicles comprising a measuring system with sensors for picking up driveability-relevant measurement values and a computation unit for deriving at least one rating representing vehicle driveability from the obtained measurement values, wherein a unit for determination of the type of driver is provided, which is connected to the computation unit.

9. A device for influencing the driveability of motor vehicles comprising a measuring system with sensors for picking up driveability-relevant measurement values and a computation unit for deriving at least one rating representing vehicle driveability from the obtained measurement values, wherein a unit for determination of the type of driver is provided in addition to a control unit adjusting the ratings to target values depending on the type of driver determined.

10. A device as claimed in claim 9, wherein a unit is provided for computation of a variable representing the momentary degree of a driver's driving skill.

11. A device as claimed in claim 9, wherein a transmission unit is provided for the transmission of data to a monitoring unit independent of the vehicle.

12. A procedure as claimed in claim 3, wherein a variable representing the degree of a driver's driving skill is derived from the measured values.

13. A procedure as claimed in claim 3, wherein the at least one rating and, if required, measured values are transmitted to a monitoring unit independent of the vehicle.

14. A device as claimed in claim 8, wherein a unit is provided for computation of a variable representing the momentary degree of a driver's driving skill.

15. A device as claimed in claim 8, wherein a transmission unit is provided for the transmission of data to a monitoring unit independent of the vehicle.

* * * * *